United States Patent
Bae et al.

(10) Patent No.: US 12,417,616 B2
(45) Date of Patent: Sep. 16, 2025

(54) METHOD, DEVICE, AND SYSTEM OF QUALITY CLASSIFYING AND SELLING PACKED MEAT BASED ON IMAGE

(71) Applicant: HONESTCHOICE CO., LTD, Seoul (KR)

(72) Inventors: Soo Hyoung Bae, Seoul (KR); Sung Chul Park, Suwon-si (KR)

(73) Assignee: HONESTCHOICE CO., LTD, Seoul (KR)

(*) Notice: Subject to any disclaimer, the term of this patent is extended or adjusted under 35 U.S.C. 154(b) by 403 days.

(21) Appl. No.: 17/922,417

(22) PCT Filed: Aug. 4, 2021

(86) PCT No.: PCT/KR2021/010202
§ 371 (c)(1),
(2) Date: Oct. 31, 2022

(87) PCT Pub. No.: WO2022/050584
PCT Pub. Date: Mar. 10, 2022

(65) Prior Publication Data
US 2023/0267704 A1    Aug. 24, 2023

(30) Foreign Application Priority Data
Sep. 4, 2020  (KR) .................. 10-2020-0113404

(51) Int. Cl.
*G06K 9/62* (2022.01)
*B65B 25/06* (2006.01)
(Continued)

(52) U.S. Cl.
CPC .......... *G06V 10/764* (2022.01); *B65B 25/065* (2013.01); *G06Q 10/083* (2013.01);
(Continued)

(58) Field of Classification Search
CPC ...... G06V 10/764; G06V 20/68; G06V 20/52; B65B 25/065; B65B 57/10; B65B 61/26;
(Continued)

(56) References Cited

U.S. PATENT DOCUMENTS

2021/0015113 A1* 1/2021 Aggarwal ............... G06F 18/40

FOREIGN PATENT DOCUMENTS

CN  110555384 A  * 12/2019
EP     3726998 B1 * 5/2022  ........... A22C 15/008
(Continued)

*Primary Examiner* — Xin Jia
(74) *Attorney, Agent, or Firm* — NKL LAW; Jae Youn Kim

(57) ABSTRACT

A method, device, and system of classifying quality and selling packed meat based on an image are disclosed. The method of classifying quality and selling packed meat based on an image performed by a server includes acquiring an image of each of packed meats, storing each of the packed meats, classifying quality of each of the packed meats based on the image of each of packed meats, calculating a price of each of the packed meats based on the quality classification of each of the packed meats, displaying each of the packed meats by each meat, each part, and each grade on each user terminal, acquiring a purchase request for first packed meat selected by a first user through a first user terminal, determining a sale of the first packed meat, and shipping the first packed meat.

2 Claims, 7 Drawing Sheets

(51) Int. Cl.
*G06Q 10/083* (2023.01)
*G06Q 30/0283* (2023.01)
*G06Q 30/0601* (2023.01)
*G06T 7/70* (2017.01)
*G06V 10/764* (2022.01)

(52) U.S. Cl.
CPC ..... *G06Q 30/0283* (2013.01); *G06Q 30/0601* (2013.01); *G06T 7/70* (2017.01)

(58) Field of Classification Search
CPC ............ G06Q 10/083; G06Q 30/0283; G06Q 30/0601; G06Q 10/08; G06Q 10/087; G06Q 30/0623; G06Q 30/0641; G06Q 30/0643; G06Q 30/02; G06Q 30/06; G06T 7/70; A22B 5/00
See application file for complete search history.

(56) References Cited

FOREIGN PATENT DOCUMENTS

| | | | |
|---|---|---|---|
| JP | 2019192169 | A | 10/2019 |
| KR | 10-2014-0057228 | A | 5/2014 |
| KR | 10-1594666 | B1 | 2/2016 |
| KR | 10-1882494 | B1 | 8/2018 |
| KR | 10-1892995 | B1 | 8/2018 |
| KR | 10-1954398 | B1 | 3/2019 |
| KR | 10-2086976 | B1 | 3/2020 |
| KR | 10-2020-0084940 | A | 7/2020 |
| KR | 10-2236974 | B1 | 4/2021 |

* cited by examiner

METHOD, DEVICE, AND SYSTEM OF QUALITY CLASSIFYING AND SELLING PACKED MEAT BASED ON IMAGE

TECHNICAL FIELD

The embodiments below relate to a technology for classifying the quality of packed meat based on an image and selling packed meat online based on the classification.

BACKGROUND

As a background art related to the embodiments, Korean Registered Patent Publication No. KR 10-1892995 B1 discloses a meat processing method for distribution. Specifically, the prior art literature discloses a meat processing method for distribution including: a first meat analysis step of firstly photographing an image of meat including a bone, analyzing a kind of meat, color of meat, distribution degree of fat, and positional relationship of the fat by using first photographing data, and classifying the meat according to the kind of the meat; a meat cutting step of deboning the meat that has undergone the first meat analysis step by each kind and cutting the meat into a preset size; a second meat analysis step of secondly photographing an upper part and the side of the meat which is cut, and automatically analyzing a thickness and weight of the meat by using second photographing data; a first label attachment step of positioning the meat analyzed in the second meat analysis step on a plate of which upper surface is coated with vegetable oil, printing meat information analyzed in the first meat analysis step and the second meat analysis step on a first label, and attaching the first label to the plate; a meat packing step of packing the meat in a vacuum pack inside of which is coated with vegetable oil in vacuum; a second label attaching step of thirdly photographing the upper part of the packed meat after the meat packing step, printing the first photographed data, the second photographed data, third photographed data, analysis data, and a meat serial number on a second label, and attaching the second label to the packed meat; a meat information uploading step of uploading the first photographed data, the second photographed data, the third photographed data, the analysis data, and the meat serial number to a preset meat sale server; and a delivery step of delivering an ordered packed meat by packing the ordered packed meat in a box when an online order and payment of the packed meat are completed from the meat sale server.

Through this, the prior art literature provides a meat processing method for distribution that can soften meat quality by massaging meat with air and applying vegetable oil thereto and minimize infection of pathogens while preventing the reproduction of microorganisms in the distribution process.

Further, Korean Registered Patent Publication No. KR 10-2086976B1 discloses an imported meat management system. Specifically, the prior art literature discloses an imported meat management system 1. In the imported meat management system 1 including an overseas meat production company terminal group 100g including a plurality of overseas meat production company terminal group 100, a network 200, an imported meat management server 300, and a customer company terminal group 600g including a plurality of customer company terminals 600, the imported meat management server 300 includes a member registration module 321 that creates a DB for imported meat in such a way that the overseas meat production company terminal group 100g is formed in a way of receiving meat kind information and meat processing status information to be exported from the overseas meat production company terminal 100 after going through a producer member ID and producer password setting process according to a producer membership registration procedure through the network 200, and storing them in a database 330 together with the producer password as "overseas meat production company unit information" for the overseas meat production company terminal 100" by using the producer member ID as metadata, the overseas meat production company unit information being stored in the database 330 by additionally requesting production area information, meat production facility information, and feed information of the overseas meat production company operating the overseas meat production company terminal 100 from the overseas meat producer terminal 100 and storing them into the database 330 by using the producer member ID as metadata, and the customer company terminal group 600g corresponding to the customer company members is formed in a way of receiving meat kind information and meat processing status information to be imported from the customer company terminal 600 after going through a customer company member ID and customer company password setting process according to a customer company membership registration procedure through the network 200, and storing them in the database 330 together with the customer company password as "customer company unit information" for the customer company terminal 600 by using the customer company member ID as metadata.

However, the prior art literatures do not disclose a method, device and system of classifying, monitoring, and managing the state of fresh food in packing units such as packed meat using IoT technology, and providing information such as packed meat to a consumer using big data and artificial intelligence. Further, the prior art literatures do not disclose a method, device, and system of classifying the quality of packed meat by inferring the quality of the invisible back side and internal quality of packed meat, etc. based on the appearance of fresh food in a packed state. Furthermore, the prior art literatures do not disclose a method, device, and system for selling packed meat, etc. on the Internet based on an "As is image" that is a photographed image of fresh food to be actually delivered to a consumer in a web page or application.

Therefore, it is requested to implement a technology for classifying, monitoring, and managing the state of fresh food in packing units such as packed meat using IoT technology, and providing information such as packed meat to a consumer using big data and artificial intelligence. Further, it is requested to implement a technology for classifying the quality of packed meat by inferring the quality of the invisible back side and internal quality of packed meat, etc., based on the appearance of fresh food in a packed state. Furthermore, it is requested to implement a technology for selling packed meat, etc. on the Internet based on an "As is image" that is a photographed image of fresh food to be actually delivered to a consumer in a web page or application.

PRIOR ART LITERATURE

Patent Literature (PTL 1) Korean Registered Patent Publication No. KR 10-1892995 B1

(PTL 2) Korean Registered Patent Publication No. KR 10-2086976 B1

(PTL 3) Korean Registered Patent Publication No. KR 10-1882494 B1
(PTL 4) Korean Registered Patent Publication KR 10-1594666 B1

DETAILED DESCRIPTION OF THE INVENTION

Technical Problem

The embodiments provide a method, device, and system of classifying, monitoring, and managing the state of fresh food in packing units such as packed meat using IoT technology, and providing information such as packed meat to a consumer using big data and artificial intelligence.

The embodiments provide a method, device, and system of classifying the quality of packed meat by inferring the quality of the invisible back side and internal quality of packed meat, etc., based on the appearance of fresh food in a packed state.

The embodiments provide a method, device, and system of selling packed meat, etc. on the Internet based on an "As is image" that is a photographed image of fresh food to be actually delivered to a consumer in a web page or application.

Furthermore, the embodiments provide a method, device, and system of solving the problems mentioned in the background art and the problems in the technical field revealed in the present specification.

Technical Solution

In accordance with an exemplary embodiment of the present invention, there is provided a method of classifying quality and selling packed meat based on an image performed by a server, the method including acquiring an image of each of packed meats, classifying quality of each of the packed meats based on the image of each of packed meats, calculating a price of each of the packed meats based on the quality classification of each of the packed meats, displaying each of the packed meats by each meat, each part, and each grade on each user terminal, acquiring a purchase request for first packed meat selected by a first user through a first user terminal, determining a sale of the first packed meat, and displaying packed meats other than the first packed meat in the packed meats by each meat, each part, and each grade on each user terminal, in which in the classifying of the quality of each of the packed meats, the quality classification of packed meat is made based on an image of packed meat in a state in which a pack of each of the packed meats is not opened.

According to one embodiment, the classifying of the quality of each of the packed meats may include defining packed meat which has been cut after classification target packed meat is cut from cut slaughtered meat as comparison target packed meat by a predefined method, referring to a front-surface image of the classification target packed meat which is in a state of being packed, referring to a front-surface image of the comparison target packed meat which is in a state of being packed, inferring meat quality information by each thickness of the classification target packed meat by applying the front-surface image of the classification target packed meat and the front-surface image of the comparison target packed meat to an artificial intelligence, and classifying quality of the classification target packed meat based on the meat quality information by each thickness of the classification target packed meat.

In accordance with another exemplary embodiment of the present invention, there is provided a system of classifying quality and selling packed meat based on an image, the system including a packed meat IoT management device configured to refrigerate and manage packed meat and photograph a state of the packed meat and a server configured to communicate with the packed meat IoT management device and each user terminal in a wired manner or wirelessly, in which the packed meat IoT management device is configured to photograph an image of each of packed meats being managed and transmit the image of each of packed meats to the server, the server is configured to classify quality of each of the packed meat based on the image of each of packed meats, calculate a price of each of the packed meats based on the quality classification of each of the packed meats, display each of the packed meats by each meat, each part, and each grade on each user terminal, acquire a purchase request for first packed meat selected by a first user through a first user terminal, transmit the purchase request for the first packed meat to the packed meat IoT management device, the packed meat IoT management device is configured to transmit to the server that the first packed meat is in stock, the server is configured to determine a sale of the first packed meat, and display packed meats other than the first packed meat in the packed meats by each meat, each part, and each grade, on each user terminal, and in an operation of classifying the quality of each of packed meats by the server, the quality classification of packed meat is made based on an image of packed meat in a state in which a pack of each of the packed meats is not opened.

Effects of the Invention

The embodiments can provide a method, device, and system of classifying, monitoring, and managing the state of fresh food in packing units such as packed meat using IoT technology, and providing information such as packed meat to a consumer using big data and artificial intelligence.

The embodiments can provide a method, device, and system of classifying the quality of packed meat by inferring the quality of the invisible back side and internal quality of packed meat, etc., based on the appearance of fresh food in a packed state.

The embodiments can provide a method, device, and system of selling packed meat, etc. on the Internet based on an "As is image" that is a photographed image of fresh food to be actually delivered to a consumer in a web page or application.

Meanwhile, effects according to the embodiments are not limited to those mentioned above, and other effects not mentioned will be clearly understood by those of ordinary skill in the art from the description below.

MODE FOR CARRYING OUT THE INVENTION

Figure 1:
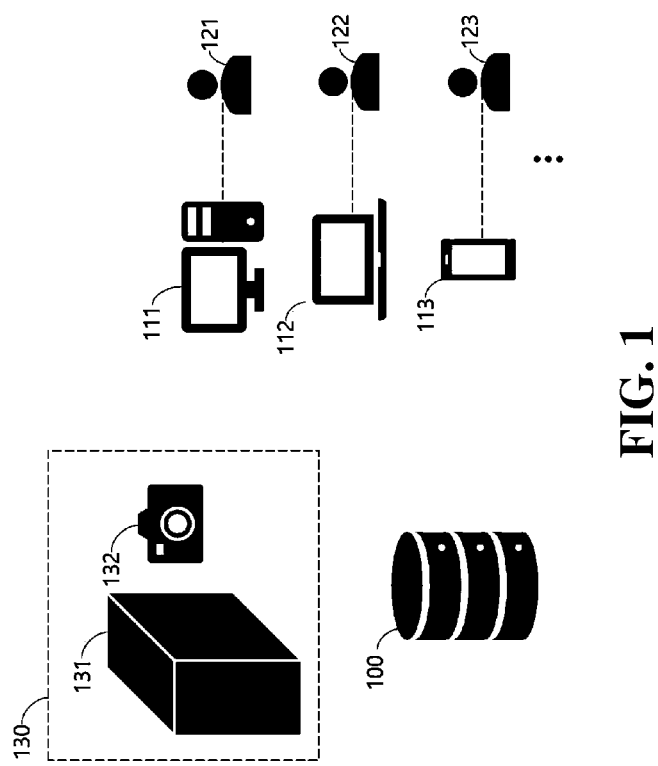
FIG. 1 is an exemplary diagram of a configuration of a system according to an embodiment.

Hereinafter, specific embodiments will be described in detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

Specific structural or functional descriptions of the embodiments are disclosed for purposes of illustration only, and may be changed and implemented in various forms. Accordingly, the embodiments are not limited to a specific disclosure form, and the scope of the present specification includes modifications, equivalents, or substitutes included in the technical spirit.

Terms such as first or second may be used to describe various components, but these terms should be interpreted only for the purpose of distinguishing one component from another component. For example, a first component may be referred to as a second component, and similarly, the second component may also be referred to as the first component.

When a component is referred to as being "coupled to" another component, it may be directly coupled or connected to the other component, but it should be understood that another component may exist in between.

The terms used in the embodiments are used for description purposes only, and should not be interpreted as limiting. The singular expression includes the plural expression unless the context clearly dictates otherwise. In the present specification, it should be understood that terms such as "comprise" or "include" are intended to designate that a feature, number, step, operation, component, part, or combination thereof described in the specification exists, but does not preclude the possibility of the presence or addition of one or more other features or numbers, steps, operations, components, parts, or combinations thereof.

Spatially relative terms "below", "beneath", "lower", "above", "upper", etc. may be used to easily describe the correlation between one component and other components as illustrated the drawings. The spatially relative terms should be understood as terms including different directions of components during use or operation in addition to the directions illustrated in the drawings. For example, when a component illustrated in the drawing is turned over, a component described as "below" or "beneath" of another component may be placed "above" of the other component. Accordingly, the exemplary term "below" may include both directions below and above. Components may also be oriented in other orientations, and thus spatially relative terms may be interpreted according to orientation.

Unless otherwise defined, all terms used herein, including technical or scientific terms, have the same meaning as commonly understood by one of ordinary skill in the art to which the embodiment belongs. Terms such as those defined in commonly used dictionaries should be interpreted as having a meaning consistent with the meaning in the context of the related art, and should not be interpreted in an ideal or excessively formal meaning unless explicitly defined in the present application.

Further, in describing the embodiments with reference to the accompanying drawings, the same components are given the same reference numerals regardless of the signs on the drawings, and redundant descriptions thereof will be omitted. In describing the embodiments, when it is determined that a detailed description of a related known technology may unnecessarily obscure the gist of embodiments, a detailed description thereof will be omitted.

FIG. 1 is an exemplary diagram of a configuration of a system according to an embodiment.

The system according to an embodiment may include a server 100, user terminals 111-113, and a packed meat IoT management device 130. The server 100, the user terminals 111-113, and the packed meat IoT management device 130 can be connected to a network to exchange data through in a wired manner or wirelessly.

The system can classify the quality of packed meat based on an image of the packed meat, and provide the Internet physical display and sale of fresh food (packed meat) based on "As is image", on the basis of the classification. Specifically, the system may automatically display an image of an actual product to be sold on the Internet shopping mall by using IoT technology when the buying and selling of the secondly cut into small pieces and packed Korean beef is conducted with e-commerce. Furthermore, the system can provide accurate information by each part of sirloin and an appropriately set price using artificial intelligence.

Here, "As is image" means a real image of a product for posting an image of the product as it is that the consumer will be actually delivered on a web page or application, in online and internet shopping. The As is image can widen the product selection range of consumers and guarantee their right to choose a legitimate product in online shopping for fresh foods such as packed meat that is not a general industrial product.

The server 100 may be a self-server 100 owned by a person or organization that provides a service using the server 100, may be a cloud server 100, or a peer-to-peer (p2p) set of distributed nodes. The server 100 may be configured to perform all or part of an arithmetic function, storage/reference function, and input and output function, and control function that a typical computer has. The server 100 may include at least one or more artificial intelligences that perform an inference function. The server 100 can be configured to communicate with the user terminals 111 to 113 in a wired manner or wirelessly.

The server 100 can be linked with a web page or application. The web page or application can use the As is image to display packed meat that is actually sold. A member account or a non-member user can purchase actual packed meat corresponding to the As is image through the web page or application. The web page or application may display quality information of packed meat by each meat, each part, and each grade for each meat sold using the As is image, and its price according to the quality information.

The user terminals 111 to 113 may be a desktop computer, a notebook computer, a tablet, a smart phone, etc. For example, as illustrated in FIG. 1, the first user terminal 111 may be a desktop, the second user terminal 122 may be a notebook computer, the third user terminal 113 may be a smartphone. The kinds of user terminals 111-113 may vary according to embodiments. The user terminals 111 to 113 can be configured to perform all or part of an arithmetic function, storage/reference function, and input and output function, and control function that a typical computer has. The user terminals 111 to 113 can be configured to communicate with the user terminals 111 to 113 in a wired manner or wirelessly. The user terminals 111-113 may access a web page linked with the server 100, or an application linked with the server 100 may be installed thereon. The user terminals 111-113 can exchange data with the server 100 through the web page or the application.

The accounts 121 to 123 may log in to the user terminals 111 to 113. For example, the first user account 121 may log in to the first user terminal 111, the second user account 122 may log in to the second user terminal 112, the third user account 123 may log in to the third user terminal 113. The accounts 121 to 123 logged into the user terminals 111 to 113 may exchange data with the server 100 through the web page or the application. Each of the accounts 121, 122 and 123 has the authority to access basic information of each user and packed meat purchase information of each user stored in the server (100).

The packed meat IoT management device 130 may include an automated logistics device 131 and a photographing device 132. The packed meat IoT management device 130 may be configured to perform all or part of an arithmetic function, storage/reference function, and input and output function, and control function that a typical computer has.

The automated logistics device 131 may keep packed meat refrigeration. The automated logistics device 131 may share packed meat management information of the server 100. The management information of packed meat stored in the automated logistics device 131 may be displayed on the packed meat in the form of an electronic display or a printed barcode.

Specifically, packed meat may be classified and stored by each meat, each part, and each grade in the automated logistics device 131. For example, if the packed meat is Korean beef, grilled parts of Korean beef may include sirloin, strip loin, tenderloin, etc. and special parts may be classified into brisket, flank, plate, etc. The automated logistics device 131 may include a refrigerated warehouse that can efficiently place and store packed meat by each part of Korean beef. The automated logistics device 131 may recognize the packed meat placed in a wrong position by an operator's mistake and sound an alarm when the operator positions the packed meat by each part on a storage table by each part of the refrigerated warehouse. The automated logistics device 131 may automatically move the packed meat to an empty seat, and may automatically pick up the packed meat and move it to a shipping area when the payment for the packed meat is made through the web page or the application. The automated logistics device 131 may include a device for outputting a shipment document for the operator to distinguish that the packed meat is paid packed meat.

The photographing device 132 may photograph the state of the packed meat stored in the automated logistics device 131. The photographing device 132 may include a standing camera or a scanner device. Due to problems such as HACCP certification for meat slaughtering and cutting facilities, it is possible to secure hygiene by photographing an image of packed meat that is actually packed to be sold rather than in the middle of production. In this case, since the packed meat is wrapped in the pack, the photographing device 132 photographs only the front surface of the meat sold, not the overall appearance of the meat sold. The image of the packed meat is transmitted to the server 100, and the server 100 may classify the overall quality of the packed meat through an algorithm based on the front surface of the packed meat. The photographing device 132 may perform photographing in a state in which lighting is optimized and reflected light is minimized.

The server 100 may record management information of the packed meat by interlocking with the automated logistics device 131 of the packed meat IoT management device 130. The server 100 may classify the quality of packed meat based on the image of the packed meat, and may provide an Internet physical display and sale of fresh food (packed meat) based on "As is image" through the web page or the application, on the basis of the classification. The server 100 may store and refer to basic information and purchase information of the accounts 121, 122 and 123, and provide accurate quality classification information of packed meat such as Korean beef sirloin and a price calculated based the classification information using artificial intelligence.

Meanwhile, in FIG. 1, for convenience of explanation, only three user terminals 111 to 113 and one packed meat IoT management device 130 are illustrated, but the number of terminals and devices may vary. As long as the processing capacity of the server 100 allows, the number of terminals and devices is not particularly limited.

Hereinafter, embodiments will be described focusing on the operation of the server 100, and the embodiments are not limited by the subject or aspect of communication, and various application examples may be employed. Hereinafter, an embodiment related to the operation of the system will be described with reference to FIG. 2. An embodiment related to packed meat will be described with reference to FIG. 3. An embodiment related to a packed meat quality classification operation will be described with reference to FIG. 4. An embodiment related to a packed meat price calculation operation will be described with reference to FIG. 5. An embodiment related to a learning operation of artificial intelligence will be described with reference to FIG. 6.

Figure 2:
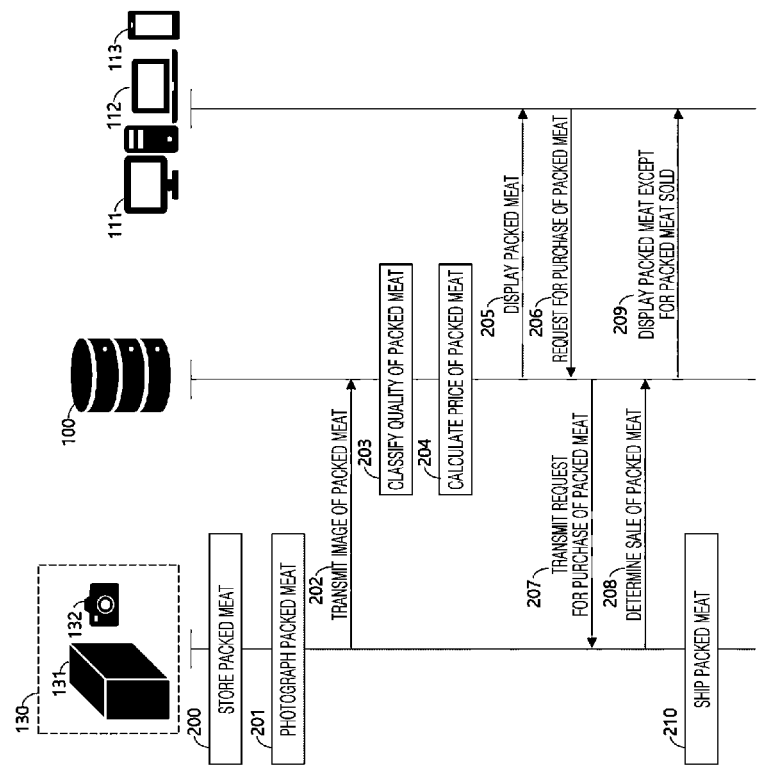
FIG. 2 is a diagram for describing an operation of the system according to an embodiment.

FIG. 2 is a diagram for describing the operation of the system according to an embodiment.

The server 100 may issue a predefined storage instruction for each packed meat to the packed meat IoT management device that stores the packed meat (200).

The predefined storage instruction may include an instruction to control the packed meat IoT management device 130. The predefined storage instruction may include temperature, humidity, etc. by each storage unit. Further, the predefined storage instruction may include a storage start instruction to start storage of the newly delivered packed meat, an instruction to count the storage date of the packed meat, an instruction to discard the old packed meat, etc.

Next, the packed meat IoT management device 130 may photograph an image of each packed meat being managed (201).

The packed meat IoT management device 130 may photograph "As is images" of fresh foods stored in the automated logistics device 131 through the photographing device 132. Specifically, the photographing device 132 may photograph packed meats to be actually sold after packing has been completed. The meat may be cut Korean beef sirloin, etc. Packing of meat can be based on the MAP method of packed meat. It is possible to minimize reflected light by optimizing lighting when photographing packed meat.

Next, the packed meat IoT management device 130 may transmit each packed meat image to the server 100 (202).

The server 100 may acquire each packed meat image, and synchronize the packed meat image and packed meat management information. The automated logistics device 131 of the packed meat IoT management device 130 may share the packed meat management information of the server 100. The management information of packed meat stored in the automated logistics device 131 may be displayed the packed meat in the form of an electronic display or a printed barcode.

Subsequently, the server 100 may classify the quality of each packed meat based on each packed meat image (203).

The server 100 may perform packed meat quality classification based on the image of packed meat in a state where the pack of each packed meat is not opened. To this end, the server 100 may define packed meat cut after analysis target packed meat is cut from cut slaughtered meat as comparison target packed meat by a predefined method. Subsequently, the server 100 may refer to the front-surface image of the analysis target packed meat which is in a state of being packed. Subsequently, the server 100 may refer to the front-surface image of the comparison target packed meat which is in a state of being packed. Subsequently, the server 100 may apply the front-surface image of the analysis target packed meat and the front-surface image of the comparison target packed meat to second artificial intelligence to infer meat quality information by each thickness or each detailed part of the analysis target packed meat. Subsequently, the server 100 may classify the quality of the analysis target packed meat based on the meat quality information by each thickness or each detailed part of the analysis target packed meat. A detailed operation of the server 100 classifying the quality of each packed meat will be described later with reference to FIG. 4.

In a subsequent order, the server 100 may calculate the price of each packed meat based on the quality classification of each packed meat (204).

Each packed meat can have quality classification by each meat, each part, and each grade. For example, packed meat by each meat, each part, and each grade may be Korean beef, sirloin, and 1+ grade. The quality classification of Korean beef, sirloin, 1+ grade can have one stage of predefined quality classification stages, such as quality classification: high, quality classification: medium high, and quality classification: medium. The higher the quality classification, the higher the price can be. The server 100 may raise the price of packed meat belonging to a quality classification of which stock is exhausted within a predefined period. The server 100 may lower the price of packed meat belonging to a quality classification that remains in stock within the predefined period. A detailed operation of calculating the packed meat price by the server 100 will be described later with reference to FIG. 5.

Next, the server 100 may display each packed meat by each meat, each part, and each grade on each user terminal (205).

The server 100 may upload an image photo of the packed meat stored in the automated logistics device 131 to a web page or application according to the management information. The server 100 may classify the imaged packed meat by each meat (cow, pig, chicken, sheep, etc.), each part (tenderloin, sirloin, chuck roll, etc.), and each grade (1++, 1+, 1, 2, 3, etc.), and upload the imaged packed meat to the web page or application along with corresponding weight and price information. Each of the accounts 121, 122, and 123 or a non-member can log in to the web page or application to check packed meat by each meat, each part, and each grade of the real photo based on the As is image and purchase the packed meat.

Further, the server 100 may display the quality classification of packed meats by each meat, each part, and each grade. For example, when the user inquires for Korean beef, sirloin, and 1+ grade among packed meats by each meat, each part, and each grade, the server 100 may display the quality classification of each packed Korean beef sirloin. As the quality classification, it is possible to have one stage of predefined quality classification stages, such as quality classification: high, quality classification: medium high, and quality classification: medium. The server 100 may display a professional explanation of what is a criterion by which the quality is classified in Korean beef sirloin.

Furthermore, when the user selects the As is image of the packed meat in which only the front surface of the meat can be checked, the server 100 may present the internal appearance of the selected packed meat as a simulation. From the internal appearance of the packed meat, the degree of marbling, the degree of tendon, color, meat quality, and the composition of muscles etc. can be shown. The internal appearance of the packed meat can be simulated based on the meat quality information by each thickness or each detailed part inferred by the second artificial intelligence. The learning process of the second artificial intelligence will be described later with reference to FIG. 6.

Subsequently, the server 100 may acquire a purchase request for first packed meat selected by a first user through the first user terminal 111 (206).

The first user account 121 using the first user terminal 111 may select the purchase of packed meat by each meat, each part, each grade, and each quality classification displayed as an As is image on the web page or application. For example, the first user account 121 may select to purchase the first packed meat belonging to the quality classification: high among Korean beef sirloin 1+ grades. The first user terminal 111 may transmit a purchase request for the first packed meat selected by the first user to the server 100.

In a subsequent order, the server 100 may transmit the purchase request for the first packed meat to the packed meat IoT management device 130 (207).

The packed meat IoT management device 130 may check whether the first packed meat is actually being stored in the automated logistics device 131. When it is checked that the first packed meat is being stored in the automated logistics device 131, the packed meat IoT management device 130 may transmit to the server that the first packed meat remains in stock.

Next, the server 100 may determine the sale of the first packed meat (208).

The server 100 may change the first packed meat from "in storage" to "sold out" in the packed meat management information. The packed meat management information of the server 100 may be shared with the packed meat IoT management device 130. A shopping basket and payment system of the web page or application linked with the server 100 and an automatic product shipment system of the packed meat IoT management device 130 may be interlocked with each other. The server 100 may make it impossible for other users to purchase the product at the moment when the user using the web page or application puts the product in the shopping basket. The time a product can be stored in the shopping basket may be limited to 15 minutes. The time during which the payment is in progress is excluded from the storage time of the shopping basket, and shipments can be automatically made when the payment is completed.

Subsequently, the server 100 may display packed meats other than the first packed meat in the packed meats by each meat, each part, and each grade on each user terminal (209).

For example, if the first packed meat purchased by the first user was a specific product with the quality classification of Korean beef sirloin: high, the server 100 may display only the actual images of the remaining packed meats on the web page or application other than the As is image of the corresponding product in the web page or application. Through this, online packed meat sale can be made based on the packed meat image that the consumer will actually purchase. Through this, it is possible to widen the product selection range of consumers in online shopping of fresh food such as packed meat, which is not a general industrial product, to provide the grounds for purchase decision, and to guarantee the right to choose a legitimate product. Meanwhile, the server 100 may set a notification function for packed meat that is not sold even after a predefined period has elapsed, and may perform follow-up measures such as discount sales on the web page or application for the packed meat.

In a subsequent order, the packed meat IoT management device 130 may ship the packed meat (210).

To this end, the server 100 may instruct the packed meat IoT management device 130 to ship the first packed meat. A shipment operation performed by the packed meat IoT management device after receiving a shipment instruction for the first packed meat may include the following.

First, the packed meat IoT management device 130 may perform a step of memorizing and picking a storage position the first packed meat. Next, the packed meat IoT management device 130 may perform a step of transporting the first packed meat to a shipping area. Subsequently, the packed meat IoT management device 130 may perform a step of outputting shipment information and a delivery destination of the first packed meat. In a subsequent order, the packed meat IoT management device 130 may pack the first packed meat once more. Next, the packed meat IoT management device 130 may deliver the first packed meat.

Meanwhile, the operation of the system may be performed on unpacked meat as well as packed meat according to an embodiment. In this case, the operation of the system may include the following.

The packed meat IoT management device 130 may photograph an image of unpacked meat of a product placed on a tray immediately before packing. The server 100 may acquire an unpacked meat image of the product placed on the tray immediately before packing. The packed meat IoT management device 130 may pack the unpacked meat. The packed meat IoT management device 130 may store the packed meat.

The server 100 may acquire the unpacked meat image of the product placed on the tray immediately before packing. The server 100 may classify the quality of each packed meat based on each unpacked meat image. The server 100 may calculate the price of each packed meat based on the quality classification of each unpacked meat. The server 100 may display each packed meat by each meat, each part, and each grade on each user terminal. In the operation of the server 100 classifying the quality of each packed meat, quality classification of the packed meat may be performed based on the image of each unpacked meat.

Figure 3:
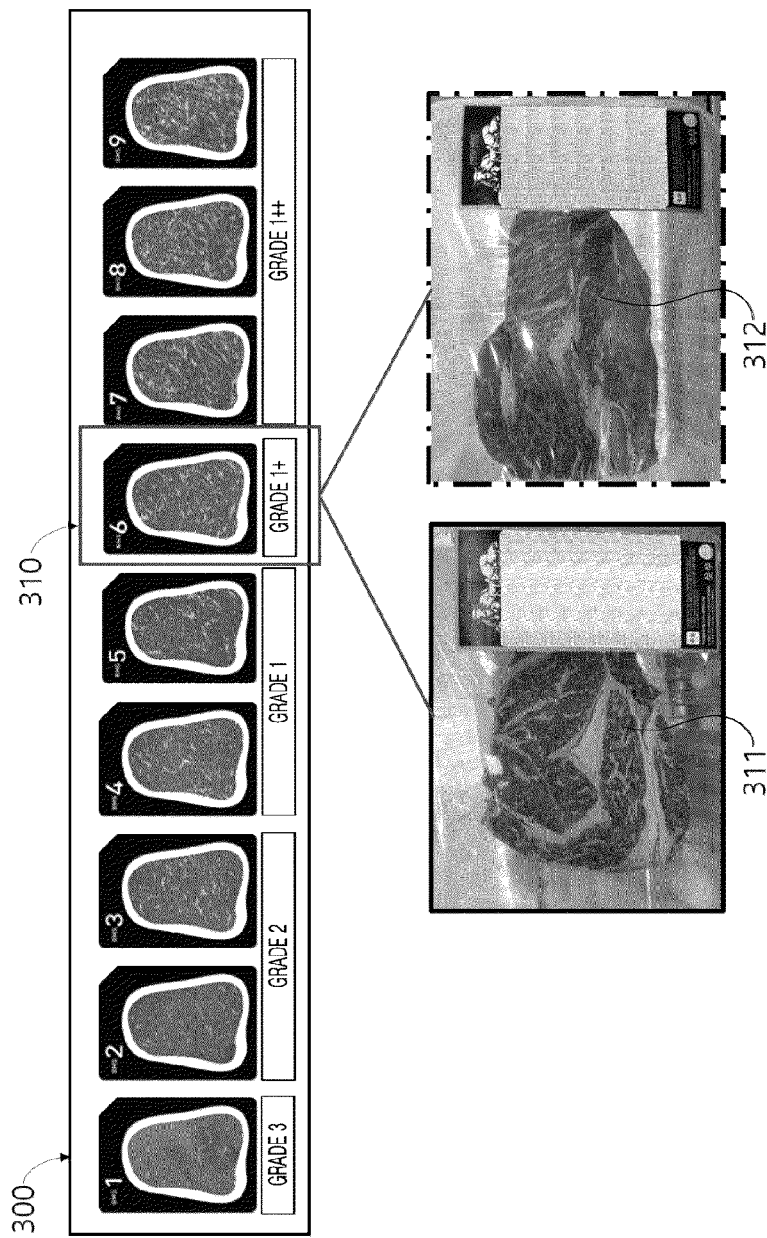
FIG. 3 is a diagram for describing packed meat according to an embodiment.

FIG. 3 is a diagram for describing packed meat according to an embodiment.

Korean beef can be graded by each part for each individual (300). Specifically, in the case of the sirloin part, the grade of the individual is measured by measuring the degree of intermuscular fat distribution (marbling) from the longest muscle section of a portion where the thoracic vertebrae of the Korean beef ends and the lumbar vertebrae begins.

Sirloin is one of the most popular and expensive parts because of its good texture and flavor. However, even the sirloin 310 produced by the same individual may have different muscle composition and fat distribution by each position. Specifically, the sirloin part of the 1st to 6th thoracic vertebrae can be divided into "upper sirloin", and the parts of the 6th to 13th thereof can be divided into "lower sirloin".

For example, as illustrated in FIG. 3, the first sirloin 311 of 1+ grade of the same individual is a lower sirloin part near the 10th thoracic vertebrae, where the ripeye cap, which is spinails muscle, is large, and the longest muscle, which is the "cube roll" part, may exist in the middle. On the other hand, the second sirloin 312 of 1+ grade of the same individual is the upper sirloin near the 3rd and 4th thoracic vertebrae, where the chuck flap tail, which is cutaneous trunci muscle, occupies approximately 30%, and the spinails muscle and semispinails muscle can be distributed at the bottom approximately 40%, and the chuck crest, which is the rhomboid muscle, and trapezius muscle may be distributed in the upper left portion approximately 30%.

Although the quality of sirloin is generally lower as the ratio of chuck crest that is tough and has a relatively low flavor is higher, in the current market system in which the grade of sirloin is classified according to the individual Korean beef, all sirloin is distributed at the same value regardless of the ratio of chuck crest. Accordingly, there may be customers who purchase tough and flavorless sirloin near the chuck roll at a high price. On the other hand, the "rib eye roll" part of the 5th to 9th thoracic vertebrae, which is known to be delicious by popular opinion, is not known to the general public and can be unreasonably distributed without his or her option.

In particular, for the sale of packed meats online, the same part of the same individual (e.g., sirloin of the same individual Korean beef) is sold at the same price without distinction by detail classification, and consumers may be exposed to uncertainty because they have to purchase meat only by looking at example photos on the Internet. Furthermore, even if there is an online shopping mall that shows the front surface of the packed meat, it is difficult for consumers to know the back surface of the packed meat and the meat quality by each thickness or each detailed part. The system according to an embodiment can classify the quality of packed meat by analyzing various muscle composition, especially the condition by each thickness of pack meat, of the Korean beef sirloin using the second artificial intelligence, and may supply and sell Korean beef sirloin by differentiating the price of Korean beef sirloin.

To this end, the packed meat IoT management device 130 may photograph an image of each packed Korean beef sirloin being managed (201). The packed meat IoT management device 130 may photograph the "As is image" of fresh foods stored in the automated logistics device 131 through the photographing device 132.

Next, the packed meat IoT management device 130 may transmit each packed Korean beef sirloin image to the server 100 (202). The server 100 may acquire each packed Korean beef sirloin image, and synchronize the packed Korean beef sirloin image and packed Korean beef sirloin management information. The automated logistics device 131 of the packed meat IoT management device 130 may share the packed Korean beef sirloin management information of the server 100.

Subsequently, the server 100 may classify the quality of each packed Korean beef sirloin based on each packed Korean beef sirloin image (203). The server 100 may perform packed Korean beef sirloin quality classification based on the image of the packed Korean beef sirloin in a state where the pack of each packed Korean beef sirloin is not opened. To this end, the server 100 may define the packed Korean beef sirloin cut after the analysis target packed Korean beef sirloin is cut from the cut slaughtered meat as a comparison target packed Korean beef sirloin by a predefined method. Subsequently, the server 100 may refer to the front-surface image of the analysis target packed Korean beef sirloin which is in a state of being packed. Subsequently, the server 100 may refer to the front-surface image of the comparison target packed Korean beef sirloin in the state of being packed. Subsequently, the server 100 may apply the front-surface image of the analysis target packed Korean beef sirloin and the front-surface image of the comparison target packed Korean beef sirloin to the second artificial intelligence to infer the meat quality information by each thickness or each detailed part of the analysis target packed Korean beef sirloin. Subsequently, the server 100 may classify the quality of the analysis target packed Korean beef sirloin based on the meat quality information by each thickness or each detailed part of the analysis target packed Korean beef sirloin. A detailed operation of the server 100 classifying the quality of each packed Korean beef sirloin will be described later with reference to FIG. 4.

In a subsequent order, the server 100 may calculate the price of each packed Korean beef sirloin based on the quality classification of each packed Korean beef sirloin (204). As the quality classification, it is possible to have one stage of predefined quality classification stages, such as quality classification: high, quality classification: medium high, and quality classification: medium. The quality classification of packed Korean beef sirloin can be decided by the ratio of marbling, the ratio of chuck crest, the presence or absence of the sirloin, and its position in the thoracic vertebrae before being cut. The higher the quality classification, the higher the price can be. The server 100 may raise the price of packed Korean beef sirloin belonging to a quality classification of which stock is exhausted within a predefined period. The server 100 may lower the price of packed Korean beef sirloin belonging to a quality classification that remains in stock within a predefined period. A detailed operation of calculating the price of the packed Korean beef sirloin by the server 100 will be described later with reference to FIG. 5.

Next, the server 100 may display each packed Korean beef sirloin on each user terminal (205). The server 100 may upload an image photo of the packed Korean beef sirloin stored in the automated logistics device 131 to the web page or an application according to the management information. Each of the accounts 121, 122, and 123 or a non-member can log in to the web page or application to check the packed Korean beef sirloin of the real photo based on the As is image, and purchase the packed Korean beef sirloin.

Further, the server 100 may display the quality classification of the packed Korean beef sirloins. As the quality classification, it is possible to have one stage of predefined quality classification stages, such as quality classification: high, quality classification: medium high, and quality classification: medium. The server 100 may display a professional explanation of what is the criterion by which the quality is classified in Korean beef sirloin. For example, the server 100 may display an explanation that the higher the marbling ratio, the higher the quality classification, the higher the ratio of chuck crest, the lower the quality classification, the quality classification is increased if cube roll is present, and the closer the position thereof in the thoracic vertebrae to the 5th to 9th thoracic vertebrae before being cut, the higher the quality classification.

Furthermore, when the user selects the As is image of the packed Korean beef sirloin that only the front surface of the meat can be checked, the server 100 may present the internal appearance of the selected packed Korean beef sirloin as a simulation. From the internal appearance of the packed Korean beef sirloin, the degree of marbling, the degree of tendon, color, meat quality, whether or not there is chuck crest, whether or not there is cube roll, etc. can be shown. The internal appearance of the packed Korean beef sirloin can be simulated based on the meat quality information by each thickness inferred by the second artificial intelligence. The learning process of the second artificial intelligence will be described later with reference to FIG. 6.

Subsequently, the server 100 may acquire a purchase request for first packed Korean beef sirloin selected by the first user through the first user terminal 111 (206). The first user account 121 using the first user terminal 111 may select the purchase of the first packed Korean beef sirloin that belongs to the quality classification: high, displayed as an As is image on the web page or application. The first user terminal 111 may transmit a purchase request for the first packed Korean beef sirloin selected by the first user to the server 100.

In a subsequent order, the server 100 may transmit the purchase request for the first packed Korean beef sirloin to the packed meat IoT management device 130 (207). The packed meat IoT management device 130 may check whether the first packed Korean beef sirloin is actually being stored in the automated logistics device 131. When it is checked that the first packed Korean beef sirloin is being stored in the automated logistics device 131, the packed meat IoT management device 130 may transmit to the server that the first packed Korean beef sirloin is in stock.

Next, the server 100 may determine the sale of the first packed Korean beef sirloin (208). The server 100 may change the first packed Korean beef sirloin from "in storage" to "sold out" in the packed Korean beef sirloin management information. The packed Korean beef sirloin management information of the server 100 may be shared with the packed meat IoT management device 130. The shopping basket and payment system of the web page or application linked with the server 100 and the automatic product shipment system of the packed meat IoT management device 130 may be interlocked with each other. The server 100 may make it impossible for other users to purchase the product at the moment when the user using the web page or application puts the product in the shopping basket. The time a product can be stored in the shopping basket may be limited to 15 minutes. The time during which the payment is in progress is excluded from the storage time of the shopping basket, and shipments can be automatically made when the payment is completed.

Subsequently, the server 100 may display the packed Korean beef sirloins other than the first packed Korean beef sirloin in each packed Korean beef sirloin on each user terminal (209). For example, if the first packed Korean beef sirloin purchased by the first user was a specific product with the quality classification of Korean beef sirloin: high, the server 100 may display only the actual images of the remaining packed meats on the web page or application other than the As is image of the corresponding product in the web page or application. Through this, online packed Korean beef sirloin sale can be made based on the packed Korean beef sirloin image that the consumers will actually purchase. Through this, it is possible to widen the product selection range of consumers in online shopping of fresh food such as packed Korean beef sirloin, which is not a general industrial product, and to guarantee the right to choose a legitimate product.

Figure 4:
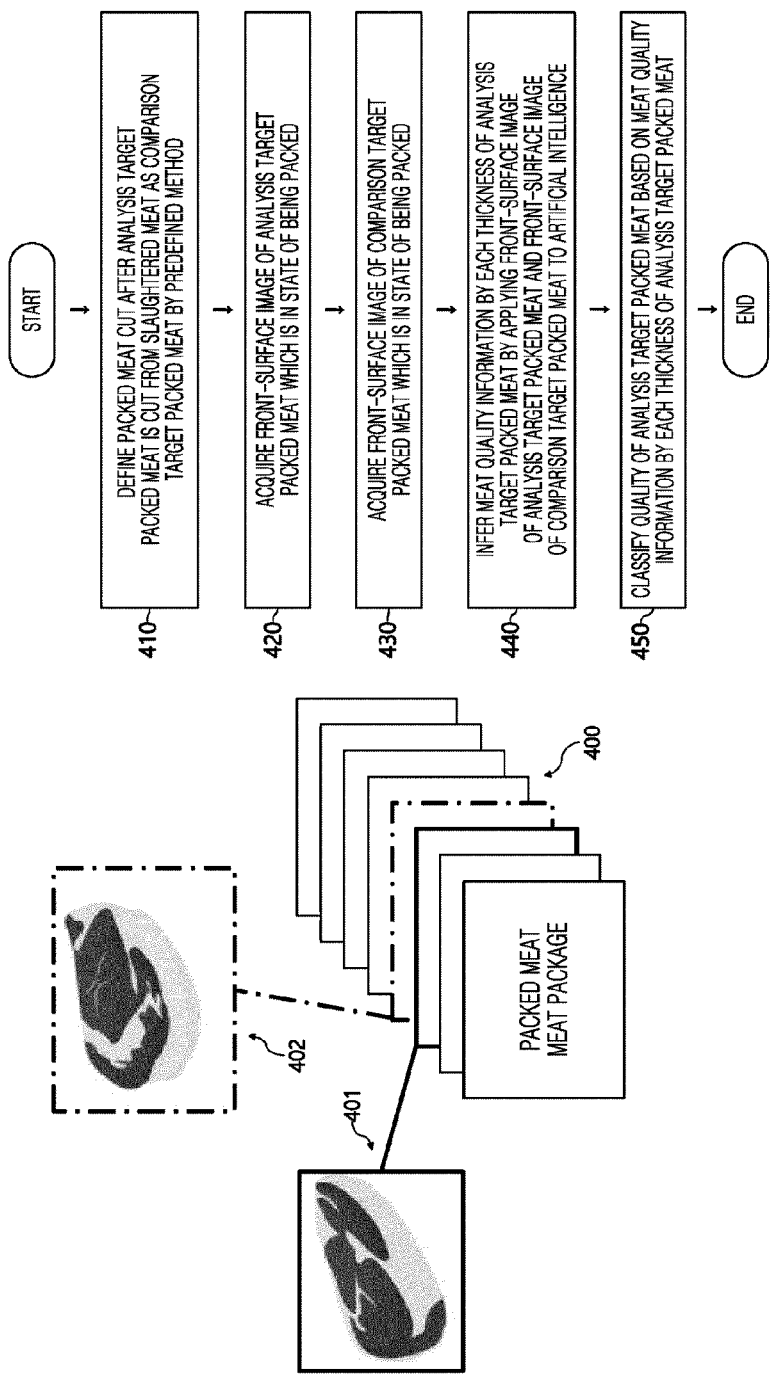
FIG. 4 is a diagram for describing an operation of classifying packed meat quality according to an embodiment.

FIG. 4 is a diagram for describing an operation of classifying packed meat quality according to an embodiment.

The operation of classifying the quality of each packed meat by the server 100 may include the following. Hereinafter, a case in which packed meat is packed Korean beef sirloin will be described as an example.

First, the server 100 may define the packed meat cut after analysis target packed meat 401 is cut from the slaughtered meat, which has been cut, as comparison target packed meat 402 by a predefined method (410).

As for the predefined method, a method of inquiring a unique serial number of each packed meat may be adopted. In this case, if the unique serial number of the analysis target packed meat 401 is N, the unique serial number of the comparison target packed meat 402 may be at least a number greater than N.

Alternatively, as the predefined method, a method of giving packed meat a lower "cut sequence number" as the cut order from the slaughtered meat is earlier, and sorting each packed meat according to the cut sequence number may be adopted. To this end, the server 100 may include first artificial intelligence trained in advance. The server 100 may define a packed meat image list and append an image of each packed meat transmitted from the packed meat IoT management device 130 to the packed meat image list. The first artificial intelligence may receive the packed meat image list and infer the cut sequence number of each packed meat included in the list. A specific learning operation of the first artificial intelligence will be described later with reference to FIG. 6.

The server 100 may sort each packed meat according to the cutting order. The server 100 may define the packed meat having a cut sequence number immediately following the cut sequence number of the analysis target packed meat 401 in the sorting result as the comparison target packed meat 402 of the analysis target packed meat 401.

Next, the server 100 may refer to the front-surface image of the analysis target packed meat 401 which is in a state of being packed (420).

The server 100 may apply the front-surface image of the analysis target packed meat 401 to the second artificial intelligence to infer meat quality information according to the front-surface image of the analysis target packed meat 401. The meat quality information according to the front-surface image of the analysis target packed meat 401 may include detailed information such as the ratio of marbling, the ratio of chuck crest, the presence or absence of the sirloin, whether there is a tendon, the color of the meat, and the position on the thoracic vertebrae before being cut. The meat quality information according to the front-surface image of the analysis target packed meat 401 may include quality classification based on the detailed information. As the quality classification, it is possible to have one stage of predefined quality classification stages, such as quality classification: high, quality classification: medium high, and quality classification: medium.

Subsequently, the server 100 may refer to the front-surface image of the comparison target packed meat 402 which is in a state of being packed (430).

In a subsequent order, the server 100 may infer meat quality information by each thickness or each detailed part of the analysis target packed meat by applying the front-surface image of the analysis target packed meat 401 and the front-surface image of the comparison target packed meat 402 to the second artificial intelligence (440).

The appearance of the analysis target packed meat 401 by each thickness or each detailed parts may be inferred based on the front-surface image of the analysis target packed meat 401 and the front-surface image of the comparison target packed meat 402. For example, compared with the front-surface image of the Korean beef sirloin of the analysis target packed meat 401, the front-surface image of the Korean beef sirloin of the comparison target packed meat 402 has a large proportion of fat ratio (white part). Therefore, it can be interpreted that a thickness layer of the analysis target packed meat 401 has a higher percentage of fat than that seen in the front-surface image of the analysis target packed meat 401 as the thickness layer of the analysis target packed meat 401 is closer to that of the front-surface image of the comparison target packed meat 402. Overall, the analysis target packed meat 401 may be interpreted to have a higher percentage of fat ratio than the fat ratio identified by the front-surface image of the analysis target packed meat 401.

The server 100 may include the second artificial intelligence for inferring meat quality information by each thickness or each detailed part the analysis target packed meat 401. The second artificial intelligence may receive the front-surface image of the analysis target packed meat 401 and the front-surface image of the comparison target packed meat 402, and may be trained to generate meat quality information by each thickness or each detailed part of the analysis target packed meat 401. The meat quality information by each thickness or each detailed part may include detailed information such as the ratio of marbling, the ratio of yoke meat, the presence or absence of the sirloin, whether there is a tendon, the color of the meat, and the position on the thoracic vertebrae before being cut. The meat quality information by each thickness or each detailed part may include the quality classification of each thickness layer based on the detailed information of each thickness layer. As the quality classification, it is possible to have one stage of predefined quality classification stages, such as quality classification: high, quality classification: medium high, and quality classification: medium. The predefined number of qualities of the thickness layer may be, for example, three, and may be employed differently according to embodiments. The predefined number of the thickness layers may increase as the thickness of the analysis target packed meat 401 increases. A specific learning operation of the second artificial intelligence will be described later with reference to FIG. 6.

The server 100 may classify the quality of the analysis target packed meat 401 based on the meat quality information by each thickness or each detailed part of the analysis target packed meat 401 (450).

The server 100 may classify the overall quality of the analysis target packed meat 401 based on the meat quality information according to the front-surface image of the analysis target packed meat 401 and the meat quality information of each thickness layer of the analysis target packed meat 401. For example, the quality classification according to the front-surface image of the analysis target packed meat 401 may be high. However, as each thickness layer of the analysis target packed meat 401 is closer to the front-surface image of the comparison target packed meat 402, the ratio of the disappearance of the cube roll, a decrease in the marbling rate, and an increase in the tendon may be high. The quality classification of the thickness layer, which is closest to the comparison target packed meat 402, of the thickness layers of the analysis target packed meat 401, may be medium. In this case, the server 100 may classify the quality of the analysis target packed meat 401 as medium.

Meanwhile, the server 100 may render the graphic of each thickness layer based on thickness information of the analysis target packed meat 401 so that the internal appearance of the packed meat can be presented to the user as a simulation on the web page or application. When the user selects the As is image of the packed meat in which only the front surface of the meat can be checked on the web page or application, the server 100 may display each thick layer graphic layer of the selected packed meat.

Through the matters described above, the server 100 may infer and provide meat quality information by each thickness or each detailed part of each packed meat based on only the front-surface images of the packed meats. Through this, the server 100 can perform quality classification of meat in a state in which the pack of the packed meat is not opened, so that hygiene can be secured. Further, the server 100 may visually and explanatory provide the users who purchase packed meat based on the front-surface image of the packed meat on the webpage or application with quality information by each thickness or each detailed part of each packed meat, and comprehensive quality information in consideration of the front-surface image of the packed meat and each thickness layer thereof. Through this, it is possible to guarantee fresh food options for users who purchase packed meat on the web page or application.

Figure 5:
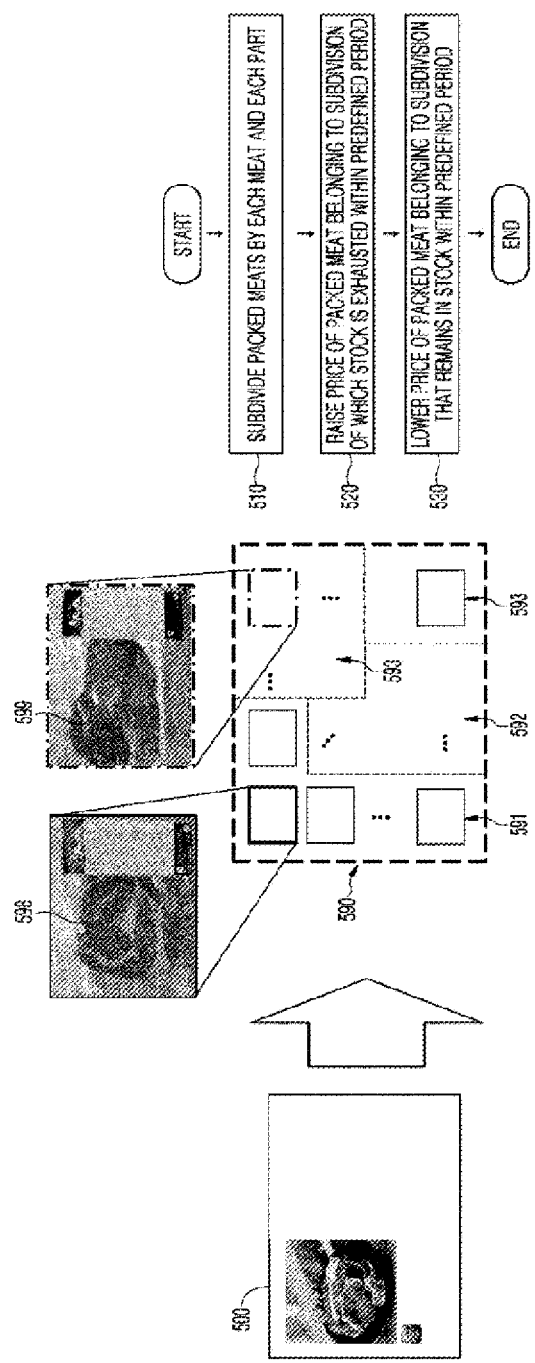
FIG. 5 is a diagram for describing packed meat display and an operation of calculating a packed meat price according to an embodiment.

FIG. 5 is a diagram for describing a packed meat display and a packed meat price calculation operation according to an embodiment.

In the case of using a conventional online selling method 500 of fresh food such as packed meat, the user can select meat (Korean beef) and part (sirloin), and grade (e.g., 1+) according to individual Korean beef, but cannot actually select the packed meat to be delivered to him/her.

Further, conventionally, fresh food such as packed meat is sold as a quantity-fixed basis (200 g, 500 g, etc.), but weight loss may occur due to the characteristics of fresh food such as packed meat. That is, from the seller's point of view, productivity is lowered due to measuring the fixed quantity, and packed meat cannot be delivered below the fixed quantity, and thus it is always necessary to pack it in excess of the fixed quantity, which can lead to significant losses (approximately 10%).

Further, for conventional fresh food such as packed meat, representative images thereof are displayed and the fixed quantity thereof is sold online, but from the point of view of a home consumer, it is impossible to know what kind of product will actually be delivered with only the online representative image, and thus the home consumer is in an uncertain position. That is, when taking Korean beef sirloin as an example, even if it is Korean beef of the same individual grade, soft and savory parts, but also relatively tough and tasteless parts may be present therein. Even with the same sirloin, there is a mixture of sirloin with a lot of intermuscular fat, sirloin with low intermuscular fat, and ripeye cap and chuck flap tail, which are known to be delicious, etc., but they are all treated as the same part, and thus there may be cases where tough parts are purchased expensive.

In order to solve the conventional problem, the server 100 may display packed meat as an As is image on the web page or application (590).

The server 100 may display each packed meat by each meat, each part, and each grade on each user terminal. To this end, the server 100 may display meat display shelves corresponding to the packed meat IoT management device 130 and the automated logistics device 131 on the web page or application. The server 100 may display different meat display shelves by each meat, each part, and each grade. On the meat display stand, packed meats of "As is image" may be displayed. Through this, the user can check the image, weight, price, quality information, etc. of the real photo of the packed meat product that is actually delivered when purchasing online. Through this, the user can have the same purchasing experience as if he or she sees and chooses Korean beef which is cut into small pieces and packed at an offline large mart.

The server 100 may display packed meats by each meat, each part, and each grade so that the quality classification of the packed meats by each meat, each part, and each grade is shown. For example, the server 100 may classify Korean beef sirloin 1+ grade packed meats to be separately displayed on a first area 591, a second area 592, a third area 593, a fourth area 594, etc. according to the quality classification on the Korean beef sirloin meat display shelves. For example, first sirloin 598 of Korean beef 1+ grade is a lower sirloin part near the 10th thoracic vertebrae, where a ripeye cap, which is spinails muscle, may be large, and the longest loin, which is "cube roll" part, may be present in the middle thereof. The server 100 may perform quality classification of the first sirloin 598. The server 100 may display the first sirloin 598 in the first area 591. On the other hand, the second sirloin 312 of Korean beef 1+ grade is an upper sirloin part near the 3rd and 4th thoracic vertebrae, and the chuck flap tail, which is cutaneous trunci muscle, may occupy approximately 30% thereof, the spinails muscle and semispinails muscle can be distributed at the bottom approximately 40%, and the chuck crest, which is the rhomboid muscle, and trapezius muscle may be distributed in the upper left portion approximately 30%. The server 100 may perform quality classification of the second sirloin 599. The quality classification of the second sirloin 599 may be different from the quality classification of the first sirloin 598. The server 100 may display the second sirloin 599 in the third area 593. The server 100 may calculate the price of packed meat differently depending on the quality classification even for packed meat of the same Korean beef grade. The server 100 may calculate the price of the first sirloin 598 to be higher than the price of the second sirloin 599.

The server 100 may highlight and display on each user terminal packed meats of the quality classification determined as preferred by each user using each user terminal among packed meats by each meat, each part, and each grade. For example, the first user account 121 may frequently purchase the part such as the first sirloin 598 having a strong savory taste among 1+ grade Korean beef sirloin. On the other hand, the second user account 122 may frequently purchase the part such as the second sirloin 599, which has a strong chewy taste and is calculated relatively inexpensive among the 1+ grade Korean beef sirloin. The server 100 may highlight and display the first area 591 on the first user terminal 111 to which the first user account 121 accesses and highlight and display the third area 593 on the second user terminal 112 to which the second user account 122 accesses, based on the purchase history of the accounts 121, 122, and 123. Meanwhile, when a user put a specific packed meat into a shopping basket or makes a purchase request, the server 100 may display a graphic for moving the corresponding packed meat from the meat display shelves with a robot arm.

The server 100 may automatically calculate the price of packed meat sold. The operation of calculating the price of packed meat by the server 100 may include the following.

First, the server 100 may subdivide the packed meats by each meat, each part, and each grade (510).

The subdivision may be made based on the quality classification of each packed meat. Each packed meat may have a predefined quality classification by each meat, each part, and each grade. For example, even with the same Korean beef sirloin 1+ grade, the quality classification of the first sirloin 598 may be higher than the quality classification of the second sirloin 599. The server 100 may subdivide the packed meats of Korean beef sirloin 1+ grade into the packed meat of the first area 591, the packed meat of the second area 592, the packed meat of the third area 593, and the packed meat of the fourth area 594 according to the quality classification.

Subsequently, the server 100 may raise the price of packed meat belonging to the quality classification of which stock is exhausted within a predefined period.

Further, the server 100 may lower the price of packed meat belonging to the quality classification that remains in stock within the predefined period.

The predefined period may vary depending on the packed by each meat, each part, and each grade. The predefined period may be a cycle in which packed meat by each meat, each part, and each grade is distributed to the packed meat IoT management device 130.

Even if the meat, part, and grade are different, the detailed quality classification of packed meat may be different. For example, the quality classification of the first sirloin 598 having a strong savory taste may be higher than the quality classification of the second sirloin 599 having a strong chewy taste. The price of the first sirloin 598 may be higher than the price of the second sirloin 599. However, some of the users may prefer chewy taste, and may find the second sirloin 599 because the price is relatively cheap. For the packed meats by each meat, each part, and each grade, the server 100 may calculate the price of packed meat belonging to each quality classification so that all packed meats of all detailed quality classifications 591, 592, 593, and 594 are sold as much as possible within a predefined period.

To this end, the server 100 may include third artificial intelligence trained in advance. The third artificial intelligence may be trained to calculate the price of packed meat belonging to each quality classification, based on the purchase history of packed meats by each meat, each part, and each grade for the predefined period, so that all packed meats of all detailed quality classifications existing by each meat, each part, and each grade are sold as much as possible within a predefined period. A specific learning operation of the third artificial intelligence will be described later with reference to FIG. 6.

Through the matters described above, the server 100 may display the As is image of fresh food such as packed meat online to sell fresh food such as packed meat. Further, the server 100 may provide a technology that allows the consumer to select a product by determining the detailed quality that exists even within the same meat, part, and grade, such as the distribution of intramuscular fat and intramuscular fat by various parts by applying Korean beef in the e-commerce method. Through this, it is possible to eliminate complaints in which packed meat that is different from the representative image of packed meat online is actually delivered. Further, since packed meat corresponding to the As is image is sold as it is, in the case of atypical packed meat, it is also possible to solve the problem of reduced productivity caused by matching several pieces for fixed amount distribution and the problem of loss of fixed amount caused by excessive provision. Furthermore, the server 100 may calculate the price of packed meat belonging to each quality classification through the third artificial intelligence so that all packed meats of all detailed quality classifications existing by each meat, each part, and each grade are sold as much as possible within a predefined period. Through this, the freshness of packed meats sold on the web page or application can be secured by allowing the packed meats by each meat, each part, and each grade to be newly distributed to the packed meat IoT management device 130 for each predefined period.

Figure 6:
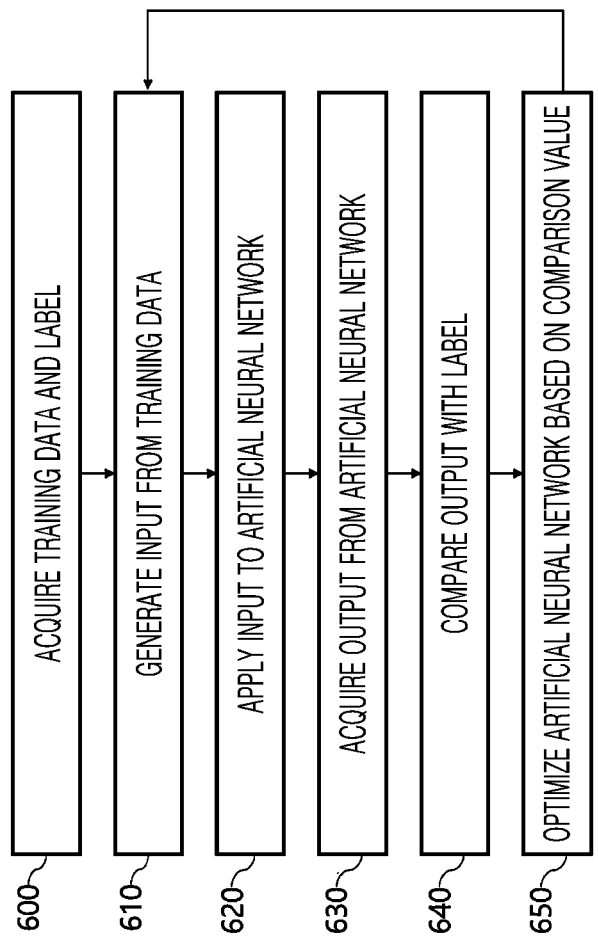
FIG. 6 is a diagram for describing training an artificial neural network according to an embodiment.

FIG. 6 is a diagram for describing training artificial intelligence according to an embodiment.

The artificial intelligence may be a component included in the server 100, and may be trained through the server 100 or a separate learning device.

The first artificial intelligence may be trained to receive a packed meat image list including packed meats for which individuals (cow, pig, sheep, etc.) and parts (tenderloin, sirloin, chuck roll, etc.), from which meat is cut, are the same as elements and infer the cut sequence number of each packed meat included in the packed meat image list. The lower the cut sequence number of packed meat the earlier the meat corresponds to the packed meat cut from the slaughtered meat.

The second artificial intelligence can be trained to receive the front-surface image of the analysis target packed meat and the front-surface image of the comparison target packed meat and to infer meat quality information by each thickness or each detailed part (position) of the analysis target packed meat. The meat quality information of the analysis target packed meat may include the degree of marbling of each thickness layer, the degree of tendon, color, meat quality, whether or not there is chuck crest, whether or not there is cube roll, the position in the raw meat before being cut into small pieces, and the quality classification of each thickness layer.

The third artificial intelligence can be trained to receive the packed meat purchase histories of the users for a predefined period and to infer the price of packed meat belonging to each quality classification for the packed meats by each meat, each part, and each grade so that all packed meats of all detailed quality classifications are sold as much as possible within a predefined period. The predefined period may be a cycle in which packed meat by each meat, each part, and each grade is distributed to the packed meat IoT management device.

Hereinafter, a process in which artificial intelligence is trained through a learning device will be described.

First, the learning device may acquire training data and a label (600).

For the first artificial intelligence training, the learning device may acquire a data set including front-surface images of packed meats cut from one part of an individual as each training data. Further, the learning device may acquire the cut sequence number of each packed meat as a label corresponding to each training data.

For the second artificial intelligence training, the learning device may acquire, as training data, a pair of packed meat for which it is intended to know meat quality information by each thickness and packed meat having a higher cutting order than that of the packed meat for which it is intended to know meat quality information by each thickness. Further, the learning device may acquire meat quality information by each actual thickness of the packed meat for which it is intended to know the meat quality information by each thickness, as a label corresponding to each training data. Further, the learning device may acquire the packed meat for which it is intended to know the meat quality information by each detailed part (position) as each training data, and may acquire the position in the raw meat of the packed meat before being cut into small pieces as a label corresponding to each training data.

For the third artificial intelligence training, a data set including the purchase histories of packed meats by each meat, each part, and each grade of consumers for a predefined period may be acquired as each training data. Further, the learning device may acquire a "corrected price" obtained by applying a deduction proportional to "the amount of stock by detailed quality classification of packed meat for a predefined period" to "the price at which packed meats were sold by detailed quality classification by each meat, each part, and each grade for a predefined period" as a label corresponding to each training data. As the amount of stock of packed meat of a certain detailed quality classification increases for a predefined period, the corrected price of packed meat having the corresponding detailed quality classification may be a price more deducted than the original price.

Now, the learning device may generate an input of artificial intelligence from the training data (610).

The learning device may use the training data as it is as the input of artificial intelligence, or may generate an input of artificial intelligence after going through a normal process of removing unnecessary information from each training data.

Next, the learning device may apply the input to the artificial intelligence (620).

The artificial intelligence included in the server 100 may be artificial intelligence that is trained according to supervised learning. The architecture of artificial intelligence may be based on a convolutional neural network (CNN), a regional convolutional neural network (RCNN), or a recurrent neural network (RNN) structure suitable for training through supervised learning.

Subsequently, the learning device may acquire an output from the artificial intelligence (630).

The output of the first artificial intelligence may be the cut sequence number of each packed meat included in the packed meat image list. The lower the cut sequence number of the packed meat, the earlier the meat corresponds to the packed meat cut from the slaughtered meat. The output of the second artificial intelligence may be meat quality information by each thickness or each detailed part (position) of analysis target packed meat. The meat quality information may include the degree of marbling of each thickness layer, the degree of tendon, color, the quality of the meat, whether there is chuck crest, whether there is the cube roll, the position in the raw meat before being cut into small pieces, and the quality classification of each thickness layer. The output of the third artificial intelligence may be an inference of the price of packed meat belonging to each quality classification such that all packed meats of all detailed quality classifications are sold as much as possible within a predefined period. The predefined period may be a cycle in which packed meat by each meat, each part, and each grade is distributed to the packed meat IoT management device.

Thereafter, the learning device may compare the output with the label (640). A process of comparing the output of the artificial intelligence corresponding to inference and the label corresponding to a correct answer may be performed by calculating a loss function. As the loss function, a known mean squared error (MSE), cross entropy error (CEE), etc. may be used. However, the loss function is not limited thereto, and if it is possible to measure the deviation, error, or difference between the output of the artificial intelligence and the label, loss functions used in various artificial intelligence models may be used.

Next, the learning device may optimize the artificial intelligence based on a comparison value (650). By updating weights of nodes of the artificial intelligence so that the learning device comparison value becomes smaller and smaller, the output of the artificial intelligence corresponding to the inference and the label corresponding to the correct answer can be gradually matched. Through this, the artificial intelligence can be optimized to output the inference close to the correct answer. Specifically, the learning device may optimize the artificial intelligence by repeating a process of resetting the weight of the artificial intelligence so that the loss function corresponding to the comparison value approaches an estimated value of the minimum value. For the optimization of artificial intelligence, a known backpropagation algorithm, stochastic gradient descent, etc. may be used, but is not limited thereto, and weight optimization algorithms used in various neural network models may be used.

The learning device may train artificial intelligence by repeating such a process.

Through this, on the basis of the packed meat image list including packed meats for which individuals (cow, pig, sheep, etc.) and parts (tenderloin, sirloin, chuck roll, etc.), from which meat is cut, are the same as elements, it is possible to train the first artificial intelligence to output the cut sequence number of each packed meat included in the packed meat image list. The first artificial intelligence may be used to define the comparison target packed meat of the analysis target packed meat in the packed meat quality classification operation described with reference to FIG. 4.

Further, it is possible to train the second artificial intelligence that receives the front-surface image of the analysis target packed meat and the front-surface image of the comparison target packed meat, and outputs meat quality information by each thickness of the analysis target packed meat or outputs meat quality information by each detailed part (position) of the packed meat The second artificial intelligence may be used to classify meat quality information by each thickness or each detailed part of the analysis target packed meat in the packed meat quality classification operation described with reference to FIG. 4.

Further, it is possible to train the third artificial intelligence that receives the packed meat purchase histories of the consumers for a predefined period, outputs the price of packed meat belonging to each quality classification for packed meats by each meat, each part, and each grade so that all packed meats of all detailed quality classifications can be sold as much as possible within a predefined period. The third artificial intelligence may be used in the packed meat price calculation operation described with reference to FIG. 5.

Figure 7:
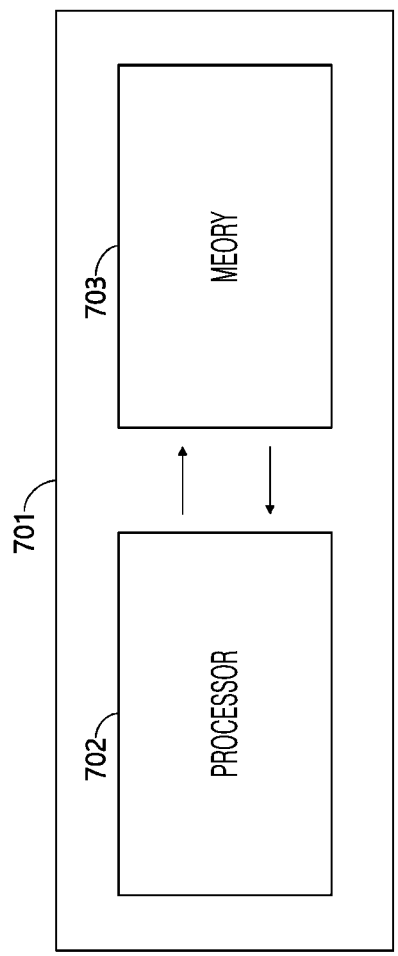
FIG. 7 is an exemplary diagram of a configuration of a device according to an embodiment.

FIG. 7 is an exemplary diagram of a configuration of a device according to an embodiment.

A device 701 according to an embodiment includes a processor 702 and a memory 703. The processor 702 may include at least one of the devices described above with reference to FIGS. 1 to 6, or may perform at least one method described above with reference to FIGS. 1 to 6. Specifically, the device 701 may be the server 100, the user terminals 111, 112, and 113, the packed meat IoT management device 130, an artificial intelligence learning device, etc. A person or organization using the device 701 may provide a service related to some or all of the methods described above with reference to FIGS. 1 to 6.

The memory 703 may store information related to the methods described above or may store a program in which the methods described above are implemented. The memory 703 may be a volatile memory or a non-volatile memory.

The processor 702 may execute a program and control the device 701. Codes of the program executed by the processor 702 may be stored in the memory 703. The device 701 may be connected to an external device (e.g., a personal computer or a network) through an input and output device (not illustrated), and may exchange data through wired or wireless communication.

The device 701 may be used to train artificial intelligence or use the trained artificial intelligence. The memory 703 may contain the artificial intelligence algorithm being trained or the trained artificial intelligence algorithm. The processor 702 may train or execute the artificial intelligence algorithm stored in the memory 703. The device 701 for training artificial intelligence and the device 701 for using the trained artificial intelligence may be the same or may be separate.

The embodiments described above may be implemented as a hardware component, a software component, and/or a combination of a hardware component and a software component. For example, the device, method, and components described in the embodiments may be implemented using one or more general purpose computers or special purpose computers, such as, for example, a processor, controller, arithmetic logic unit (ALU), digital signal processor, microcomputer, field programmable gate array (FPGA), programmable logic unit (PLU), or any other device capable of executing and responding to instructions. The processing device may execute an operating system (OS) and one or more software applications running on the operating system. Further, the processing device may also access, store, manipulate, process, and generate data in response to execution of the software. For the convenience of understanding, although it is sometimes described that one processing device is used, one of ordinary skill in the art will recognize that the processing device may include a plurality of processing elements and/or a plurality of types of processing elements. For example, the processing device may include a plurality of processors or one processor and one controller. Other processing configurations, such as parallel processors, are also possible.

The method according to the embodiment may be implemented in a form of program instructions that can be executed through various computer means and recorded in a computer-readable medium. The computer-readable medium may include program instructions, data files, data structures, etc. alone or in combination. The program instructions recorded on the medium may be specially designed and configured for the embodiment, or may be known and available to those skilled in the art of computer software. Examples of the computer-readable recording medium include hardware devices specially configured to store and execute such program instructions, such as, magnetic media such as hard disks, floppy disks, and magnetic tapes, optical recording media such as CD-ROMs and DVDs, magneto-optical media such as floppy disks, ROMs, RAMs, flash memories, etc. Examples of program instructions include not only machine language codes such as those generated by a compiler, but also high-level language codes that can be executed by a computer using an interpreter or the like. The hardware devices described above may be configured to operate as one or more software modules to perform the operations of the embodiments, and vice versa.

Software may include a computer program, code, instructions, or a combination of one or more thereof, and may configure the processing device to operate as desired, or independently or collectively instruct the processing device to operate. Software and/or data, in order to be interpreted by the processing device or to provide instructions or data to the processing device, may be permanently or temporarily embodied in any type of machine, component, physical device, virtual equipment computer storage medium or device, or a transmitted signal wave. The software may be distributed over networked computer systems and stored or executed in a distributed manner. Software and data may be stored in one or more computer-readable recording media.

Although the embodiments have been described with reference to the limited drawings as described above, those skilled in the art may apply various technical modifications and variations thereto based on the matters described above. For example, even if the described techniques are performed in a different order than the described method, and/or the described components of the system, structure, device, circuit, etc. are coupled or combined in a different form than the described method, or replaced or substituted by other components or equivalents, an appropriate result can be achieved.

Therefore, other implementations, other embodiments, and equivalents to the claims are also within the scope of the following claims.

What is claimed is:

1. A method of classifying quality and selling packed meat based on an image performed by a server, the method comprising:
    issuing a predefined storage instruction for each of packed meats to a packed meat IoT management device;
    acquiring an image of each of the packed meats;
    classifying quality of each of the packed meats based on the image of each of packed meats;
    calculating a price of each of the packed meats based on the quality classification of each of the packed meats;
    displaying each of the packed meats by each meat, each part, and each grade on each user terminal;
    acquiring a purchase request for first packed meat selected by a first user through a first user terminal;
    determining a sale of the first packed meat;
    instructing the packed meat IoT management device to ship the first packed meat; and
    displaying packed meats other than the first packed meat in the packed meats by each meat, each part, and each grade on each user terminal, wherein,
    in the classifying of the quality of each of the packed meats, the quality classification of packed meat is made based on an image of packed meat in a state in which a pack of each of the packed meats is not opened.

2. The method of claim 1, wherein
the classifying of the quality of each of the packed meats comprises
    defining packed meat which has been cut into small pieces after classification target packed meat is cut into small pieces from raw meat before being cut into small pieces as comparison target packed meat by a predefined method,
    referring to a front-surface image of the classification target packed meat which is in a state of being packed,
    referring to a front-surface image of the comparison target packed meat which is in a state of being packed, inferring meat quality information by each position of the classification target packed meat by applying the front-surface image of the classification target packed meat and the front-surface image of the comparison target packed meat to an artificial intelligence, and classifying quality of the classification target packed meat based on the meat quality information by each position of the classification target packed meat.

* * * * *